(12) United States Patent
Shibuya

(10) Patent No.: US 11,839,012 B2
(45) Date of Patent: Dec. 5, 2023

(54) STATIC ELIMINATOR

(71) Applicant: Hiroki Shibuya, Nagano (JP)

(72) Inventor: Hiroki Shibuya, Nagano (JP)

(73) Assignee: Hiroki Shibuya, Nagano (JP)

( * ) Notice: Subject to any disclaimer, the term of this patent is extended or adjusted under 35 U.S.C. 154(b) by 17 days.

(21) Appl. No.: 17/615,468

(22) PCT Filed: Dec. 7, 2020

(86) PCT No.: PCT/JP2020/045493
§ 371 (c)(1),
(2) Date: Nov. 30, 2021

(87) PCT Pub. No.: WO2021/117681
PCT Pub. Date: Jun. 17, 2021

(65) Prior Publication Data
US 2022/0240363 A1    Jul. 28, 2022

(30) Foreign Application Priority Data

Dec. 12, 2019 (JP) .................................. 2019-224812

(51) Int. Cl.
*H05F 3/04* (2006.01)
*B64D 45/02* (2006.01)

(52) U.S. Cl.
CPC .............. *H05F 3/04* (2013.01); *B64D 45/02* (2013.01)

(58) Field of Classification Search
CPC .. H05F 3/04; H05F 3/00; B64D 45/02; B64D 45/00
USPC ........................................ 361/212, 218, 220
See application file for complete search history.

(56) References Cited

U.S. PATENT DOCUMENTS

| | | | | |
|---|---|---|---|---|
| 4,905,931 A | * | 3/1990 | Covey | F16B 33/004 411/3 |
| 5,987,335 A | * | 11/1999 | Knoedl, Jr. | H04B 15/00 455/217 |
| 6,260,808 B1 | | 7/2001 | Bodeau et al. | |
| 6,655,637 B1 | | 12/2003 | Robinson | |
| 6,804,106 B2 | * | 10/2004 | Zhuang | H02G 13/00 174/2 |
| 2009/0033573 A1 | | 2/2009 | Capece et al. | |

(Continued)

FOREIGN PATENT DOCUMENTS

| | | |
|---|---|---|
| CN | 112319865 A | 2/2021 |
| DE | 3242882 A1 | 6/1983 |

(Continued)

OTHER PUBLICATIONS

International Preliminary Report on Patentability for PCT/JP2020/045493, dated Jul. 6, 2021, 4 pgs.

(Continued)

*Primary Examiner* — Danny Nguyen
(74) *Attorney, Agent, or Firm* — Blank Rome LLP

(57) ABSTRACT

A static eliminator (10) includes: a first conductor (11) that is electrically connected to at least a part of a static elimination target object (1); and a dielectric shell (15) that forms, between the first conductor and the dielectric shell, a first space (13) in which a gas (12) providing a condition of lowering a discharge starting voltage is sealed. The dielectric shell is exposed to an external space (9), as examples may be dome-shaped, spherical, ellipsoidal, or semi-ellipsoidal, and may be translucent.

16 Claims, 6 Drawing Sheets

(56) References Cited

U.S. PATENT DOCUMENTS

2009/0207546 A1  8/2009  Cho et al.
2022/0011371 A1  1/2022  Miars

FOREIGN PATENT DOCUMENTS

| JP | 62-166200 A | 7/1987 |
|----|-------------|--------|
| JP | 62-195998 U | 12/1987 |
| JP | H-01131772 A | 5/1989 |
| JP | 2003247693 A | 9/2003 |
| JP | 2005/267962 A | 9/2005 |
| WO | WO-2007/142133 A1 | 12/2007 |

OTHER PUBLICATIONS

International Search Report for PCT/JP2020/045493, dated Feb. 26, 2021, 3 pgs.
Extended European Search Report, dated Apr. 26, 2023, 11 pgs.

* cited by examiner

STATIC ELIMINATOR

RELATED APPLICATIONS

This application is a national phase application of International Application No. PCT/JP2020/045493, filed Dec. 7, 2020, which claims the benefit of Japanese Patent Application No. 2019-224812, filed on Dec. 12, 2019, The entire contents of these applications are hereby incorporated by reference.

TECHNICAL FIELD

The present invention relates to a static eliminator.

BACKGROUND ART

Airplanes have many static dischargers installed on their wings and reduce static electricity through self-discharge. On high-altitude aircraft that fly in low pressure environments, dischargers are particularly effective since discharge is more likely to occur than at ground level according to Paschen curves. On the other hand, since helicopters have rotors that rotate at high speed, it is difficult to install static dischargers with sharp protruding parts because people will come close to the fuselage. Satellites and space probes have surfaces covered with metal, and when unavoidable, it is recommended that a conductive coating is applied to a dielectric to set the entire surface at the same potential. Although creeping discharge will not occur when the entire surface is at the same potential, as before, it is not possible to prevent dielectric breakdown of the dielectric between the surface and internal electric circuits.

Japanese Laid-open Patent Publication No. 2005-267962 (Patent Literature 1) states that although conventional surface discharge suppression technology has used a conductive material or a conductive coating in order to prevent charging from occurring, many conductive materials used on satellites are expensive and also prone to exfoliation and dissociation of the coating material. In addition, there are the disadvantages of difficult handling and difficult application in only parts with a uniform and flat surface. Patent Literature 1 discloses a low-cost and simple configuration that suppresses the influence of surface discharge through the provision of a discharge electrode in the periphery of the dielectric. That is, the discharging apparatus disclosed in Patent Literature 1 includes a conductive panel, a dielectric that covers one surface of the panel, and a discharge electrode that has one end electrically connected to the panel and another end that overhangs the surface of the dielectric that is not in contact with the panel.

SUMMARY OF INVENTION

For objects that are difficult to ground, mostly aerospace devices and in particular satellites and space probes (spacecraft) in outer space, it is necessary to eliminate static electricity to prevent failures that would be caused by such static electricity. That is, since an aerospace device cannot be grounded, the fuselage is susceptible to becoming charged with static electricity, which will damage electrical equipment used for communication or the like. In particular, since satellites and space probes are surrounded by a vacuum, it is difficult to reduce static electricity through self-discharge (that is, corona discharge). When there is a large potential difference between the surface of the fuselage and internal electric circuits, the dielectric positioned in between becomes damaged due to dielectric breakdown (insulation breakdown). For this reason, there are many examples of satellites that have stopped operating unexpectedly. Also, when conductive areas are spread out on the surface of the fuselage and potential differences are produced between these conductive areas, creeping discharge will occur at the dielectric located at the boundaries, resulting in gradual damage to the fuselage. When a dielectric on the surface of the fuselage becomes charged, the dielectric will itself undergo dielectric breakdown due to the discharge between the dielectric and the periphery. When these phenomena occur in a solar cell panel, the operating life will be limited.

In the example in Patent Literature 1 described above, although a spacecraft as a whole will have a potential of several kV due to the inflow and outflow of space particles during orbit, since the dielectric floats with respect to the potential of the spacecraft, the dielectric will have a different potential to the potential of the spacecraft as a whole. When the potential difference between the spacecraft potential and the potential of the dielectric reaches 400V or more, discharge that occurs between the dielectric and fibrous discharge electrodes are used to try to eliminate the potential difference between the spacecraft potential and the potential of the dielectric. However, it is believed that with the discharging apparatus in Patent Literature 1, creeping discharge will occur at the surface and electric charge will be absorbed and reduced by ejected plasma, but since the surface is converted into plasma and destroyed, there is the risk that long-term operation may not be possible. In addition, at orbital altitudes of several hundred km or more, as examples, at low earth orbit (LEO, an altitude of 2000 km or less) to medium earth orbit (MEO, an altitude of 2000 km to geosynchronous orbit (35,786 km)), and also at higher orbital altitudes, there is a large decrease in ambient pressure. This means that the discharge starting voltage will rise to several thousand kV or higher, which effectively prevents discharge from starting, and even if discharge does occur, there is a risk of breakage due to the resulting discharge voltage.

One aspect of the present invention is a static eliminator (electrostatic eliminator, static elimination equipment, static eliminator apparatus, static eraser, static electricity eliminating device) including: a first conductor that is electrically connected to at least a part of a static elimination target object; and a dielectric shell that is exposed to an external space and forms, between the first conductor and the dielectric shell, a first space in which a first gas (first type of gas) providing a condition of lowering a discharge starting voltage is sealed. By sealing the gas for the predetermined condition in the first space, this static eliminator can maintain a discharge starting voltage that is unaffected by the conditions in the external space. Accordingly, it is possible to use the surface potential of the static elimination target object to cause electric discharge inside the first space with an electric field in the external space that passes through the dielectric shell. Discharge is a phenomenon where energy such as heat, electromagnetic waves, and sound is released, so that electrical energy is converted into other types of energy and released. This means that by causing electric discharge in the first space, static electricity can be removed from a static elimination target object that has become charged with static electricity, which lowers the surface potential of the static elimination target object.

The dielectric shell may be dome-shaped, spherical, or ellipsoidal. This makes it easy to withstand the difference in pressure relative to the external space. The dielectric shell may cover at least 50% of the surface area of the first space.

The dielectric shell may be exposed in a state of protruding into the external space and without contacting other objects. This makes it easier for the influence of the electric field in the external space to be reflected in the first space through the dielectric shell.

The exterior space is typically outer space or space on a planet or satellite with lacking atmosphere. The dielectric shell may be translucent. Even in a vacuum where it is difficult to release energy such as heat and sound to the outside, it is easy for discharge to release energy to the external space in the form of electromagnetic waves (light). The dielectric shell may form a first space that includes the first conductor in the center or inside, the first conductor may cover a part or parts of the surface of the first space, and may form a part or parts of the first space. That is, the first conductor may or may not form a part of the container that acts together with the dielectric shell to seal the gas.

The first conductor may be detachably attached to the static elimination target object, and the first conductor may be a part of the static elimination target object. The static eliminator may have a discharge electrode that is installed inside the first space and is electrically connected to the first conductor. This makes it easy to further lower the discharge starting voltage. One favorable example of a discharge electrode is a wire-shaped electrode formed in an upright arc.

Another aspect of the present invention is a static elimination target object including the static eliminator described above. The static elimination target object may have a dielectric shell that forms a first space, between at least a part of a surrounding structure of the static elimination target object and an external space, in which a gas providing a condition of lowering (reducing) a discharge starting voltage is sealed. The static elimination target object may be any object whose surface potential may rise due to static electricity.

Examples include automobiles, ships, human bodies and their accessories, portable electric devices, and electronic circuits. Since it is often difficult to ground a moving object, it is particularly effective to provide the static eliminator described above with a moving object as the static elimination target object. The most suitable example of a static elimination target object is an aerospace device that travels in a space where it is difficult to release static electricity to the external space.

DESCRIPTION OF EMBODIMENTS

Figure 1:
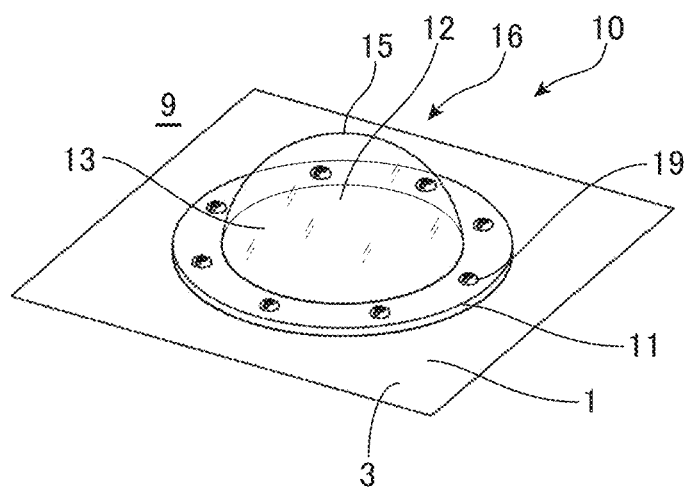
FIG. 1 is a perspective view schematically depicting an example static eliminator.
Figure 2:
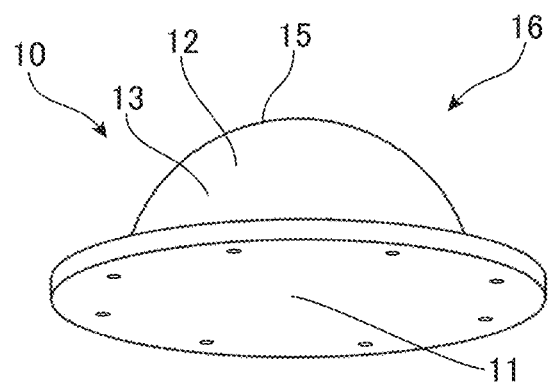
FIG. 2 is a perspective view schematically depicting the static eliminator, when looking from a bottom surface.
Figure 3:
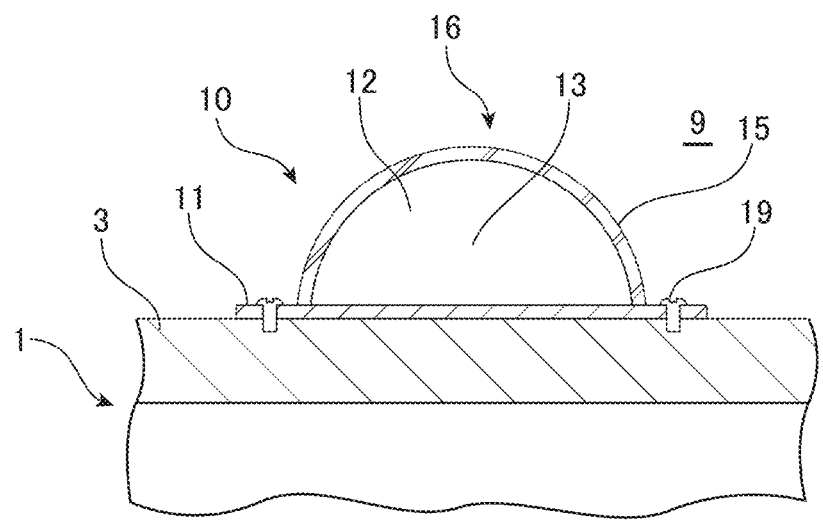
FIG. 3 is a cross-sectional view schematically depicting the configuration of the static eliminator.

FIG. 1 depicts an outline of an example static eliminator. FIG. 2 depicts a state where the static eliminator has been removed from an object, and FIG. 3 schematically depicts the configuration of the static eliminator by way of a cross-sectional view in a state where the static eliminator is attached to the object. The static eliminator (electrostatic eliminator, static elimination equipment, static eliminator apparatus, static eraser, static electricity eliminating device, eliminator apparatus or static electricity eliminator apparatus) 10 is an apparatus that is attached to the surrounding structure (outer shell, exterior, outer wall, outer wall surface or outer structure) 3 of a static elimination target object 1, such as a satellite. The static eliminator 10 includes a first conductor 11 that is electrically connected to at least a part of the static elimination target object (elimination target, elimination target object or static electricity elimination target object) 1, which in this example is the surrounding structure 3, and a dielectric shell 15 that forms a first space 13 between itself and the first conductor 11 where a first gas (that is, a first type of gas) 12 is sealed for providing (satisfying, establishing) a condition of lowering (reducing) a discharge starting voltage. The dielectric shell 15 is provided so as to be exposed to a space (external space) 9 outside the elimination target 1.

In this eliminator 10, a closed container 16 in which the gas 12 is sealed is constructed by the first conductor 11, which is shaped as a plate and forms a bottom portion (base plate), and the dielectric shell 15, which is dome-shaped and attached onto the first conductor 11. The eliminator 10 is fixed to the static elimination target object 1 by attaching the first conductor 11, which protrudes or widened (extended) around the dielectric shell 15 in the form of a flange, to the conductive outer structure 3 using rivets 19, mounting screws, conductive adhesive, or the like. At the same time, the first conductor 11 becomes electrically connected to the outer structure 3 of the static elimination target object 1.

The gas 12 sealed in the first space 13 of the static eliminator 10 is a noble gas (rare gas) such as argon, helium, neon, xenon, or krypton, an inert gas containing noble gas, nitrogen gas, or the like, or a mixture (or mixed gas) containing at least one of these gases. The gas is adjusted so that the pressure (that is, the internal pressure of the container 16) is 0.5 to 20 Torr (50 to 3000 Pa), or further adjusted to 1 to 10 Torr (100 to 1500 Pa) for example. One example of a mixed gas is a Penning mixture containing a quench gas (buffer gas) in addition to a noble gas (a glowing gas) as a main component. A gas that satisfies these conditions is one example of the first gas 12 that lowers or reduces the discharge starting voltage, and may contain other components or may be a gas composed of other components. It is also possible to adjust the pressure according to the components of the gas to lower the discharge starting voltage.

Figure 4:
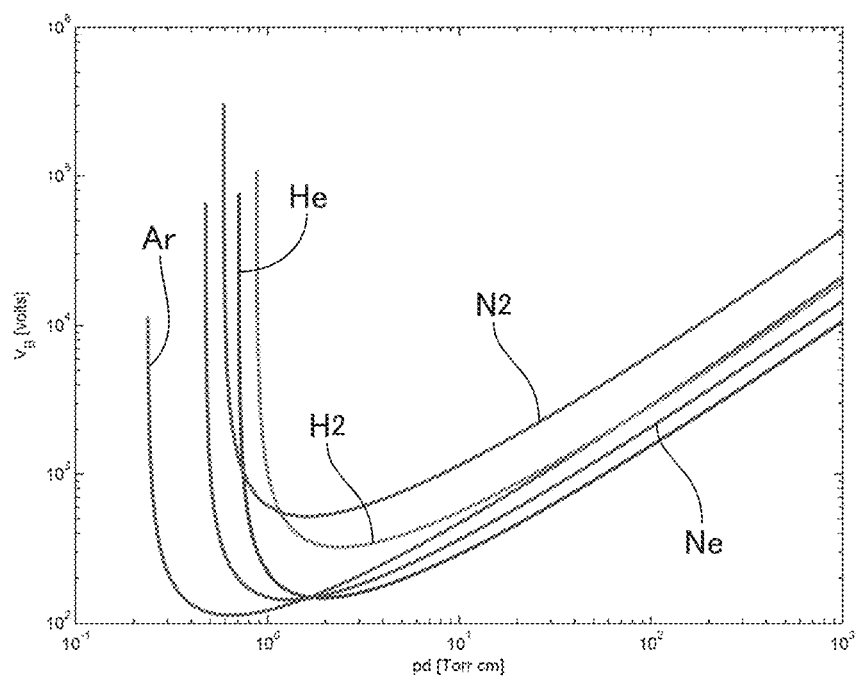
FIG. 4 is a diagram depicting some examples of Paschen curves.

FIG. 4 depicts the Paschen curves of a number of gases. According to Paschen's law, the discharge starting voltage V is given as a function f(pd) of the product of the gas pressure p and the gap (distance) between the electrodes (d). In view of the need to cause discharge in cm units inside the first space 13 of the eliminator 10, it is desirable for a first gas 12 that contains an inert gas to be sealed in the first space 13 in the range of pressures stated above.

Figure 5:
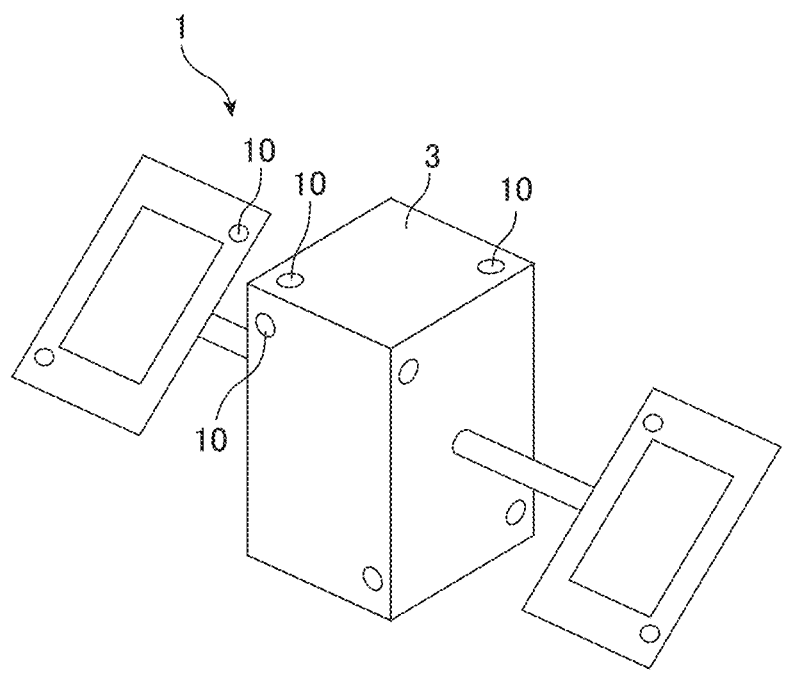
FIG. 5 is a diagram schematically depicting an example of a satellite on which static eliminators have been mounted.

FIG. 5 depicts one example where a plurality of static eliminators 10 have been provided on a satellite as the static elimination target object 1. According to the dominant view, electric discharge (as one example, lightning) is an electric current. On the other hand, electric discharge emits energy such as heat, electromagnetic waves, and sound. Paradoxically, it can be said that when electric discharge occurs, electrical energy, and more specifically, the surface potential of an object that has become charged with static electricity, is lowered. This means that by attaching the eliminator 10 to an object that is difficult to electrically ground, in most cases aerospace devices, and in particular a satellite or space probe in outer space, as the static elimination target object 1, it is possible to cause electric discharge in the gas 12 sealed in the closed space 13 using the surface potential which derives from the static electricity accumulated in the object 1. This means that static electricity at the static elimination target object 1 can be reduced or eliminated by releasing the energy through discharge at the eliminator 10.

The dielectric shell 15 may be a wall body formed of a material that allows an electric field in the periphery (external space) 9 to easily penetrate in the first space 13 in which the gas 12 is sealed, and may construct all or part of a container (pressure container or sealed container). In the eliminator 10, a space electric field (potential difference) relative to the first conductor 11 is formed by an electric field (electrical field) that has penetrated or passed through or via the dielectric shell 15 and entered the first space 13. This means that in the eliminator 10, self-discharge occurs inside the first space 13, which is an environment that facilitates self-discharge, at a much lower potential difference than in the external space 9.

It is desirable that the dielectric shell 15 is protruding into the external space 9 from the outer structure 3 of the static elimination target object 1 and exposed in a non-contract state with (without contact with) other objects. According to experiments and computer simulations, discharge is facilitated when the first space (discharge region) 13 where the discharge occurs protrudes outward beyond the outer structure (outer surface, fuselage surface) 3 of the target 1. On the other hand, when the dielectric shell 15 is positioned inside a recess formed in the outer structure (a metal surface) 3, a strong electric field is unlikely to form and electric discharge is unlikely to occur.

To efficiently emit or release electromagnetic waves (light) that have been generated by discharge, the dielectric shell 15 may use a translucent member made of a dielectric material, for example, a transparent resin or glass as a transparent member. In particular, glass materials, such as quartz glass and heat-resistant glass (borosilicate glass), are resistant to deteriorate and have a small coefficient of thermal expansion, which makes them ideal for satellites that are cyclically exposed to high and low temperatures. A material, such as germanium glass and chalcogenide glass, that easily transmits infrared rays may be used, and is suited to releasing heat generated in the first space 13 where discharge occurs to the external space 9. The dielectric shell 15 may cover at least 50% of the surface area of the first space 13 where discharge occurs, which makes it easy for external electric fields to penetrate into the first space 13.

Although there are no particular limitations on the shape of the dielectric shell 15, the upper part may be hemispherical (dome-shaped), spherical, ellipsoidal, semi-ellipsoidal, or the like in order to withstand the pressure difference between the gas 12 sealed inside the dielectric shell 15 and the outside 9. The thickness of the dielectric shell 15 may also be selected with consideration to the pressure difference and leakage of the gas 12. In addition, the material and structure of the dielectric shell 15 may be selected with consideration to the heat generated by discharge. In outer space in particular, heat is emitted or released only by radiation. For this reason, the dielectric shell 15 may also be transparent to infrared rays. To ensure a sufficient amount of energy is released by the discharge, it is desirable to provide a certain volume as the first space 13 where the discharge occurs, so that the dielectric shell 15 may have a diameter (or major axis, diagonal length, or representative length) in a range of several mm to several tens of cm, where the lower limit of the representative diameter (or length) may be 5 mm, 10 mm, or 20 mm and the upper limit may be 500 mm, 300 mm, or 100 mm. The sizes of the dielectric shell 15 and the eliminator 10 may be larger than or smaller than the sizes given above depending on the size of the elimination target object 1.

The first conductor 11 and the dielectric shell 15 of the static eliminator 10 may be made of different materials, or a part of an integral member, for example, a part of the dielectric shell 15, may be treated so as to become conductive and used as the first conductor 11. As will be described later, the first conductor 11 may be a part of the static elimination target object 1, for example, part of a conductive outer structure or wall 3. The first conductor 11 may be a metal or may be a transparent electrode, such as graphene or indium tin oxide. One part of the static elimination target object 1 to which the static eliminator 10 is connected is typically a conductive part or a part that has been treated with a coating or the like so as to become conductive.

If the entire surface of an aerospace device, which is the static elimination target object 1, does not have an equal potential, the eliminators 10 may be installed on the equipotential parts respectively. The size of the eliminator or eliminators 10 and the number of installed eliminators 10 can be appropriately selected according to the expected buildup of static electricity and the amount of energy derived from discharge. When an aerospace device 1 that cannot be grounded becomes charged with static electricity, the absolute value of the surface potential of the conductive outer surface 3 will rise. When the absolute value of the surface potential reaches a discharge starting voltage in keeping with the state of the gas 12 in the sealed cover (dielectric shell) 15, discharge will occur in the gas 12. This discharge emits energy, such as heat, electromagnetic waves (light), and sound. From the viewpoint of the law of conservation of energy, surface potential will drop in place of the released energy. This results in the elimination of static electricity from the aerospace device 1.

Note that the phenomenon referred to as "discharge" for this eliminator 10 is a phenomenon where a gas exposed to a strong electric field is converted to plasma. The discharge that occurs or generated in the eliminator 10 may be creeping discharge along the dielectric shell 15, may be one-electrode discharge (single-electrode discharge, mono-electrode discharge, also referred to as "corona discharge" or "St. Elmo's fire"), or may be self-discharge that accompanies conversion of a gas to plasma. When a plurality of aerospace devices 1 approach each other, electric fields are formed in the external space 9 due to differences between the respective surface potentials, and electric discharges will occur in the first spaces 13 of the static eliminators 10 so as to resolve or moderate the electric fields. As a result, it is possible to reduce the risk of discharge occurring between a plurality of aerospace devices 1.

Figure 6:
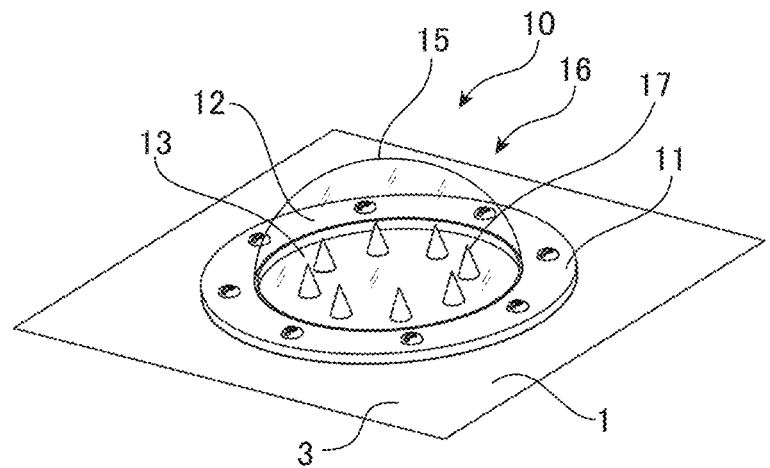
FIG. 6 is a perspective view depicting another example of a static eliminator.
Figure 7:
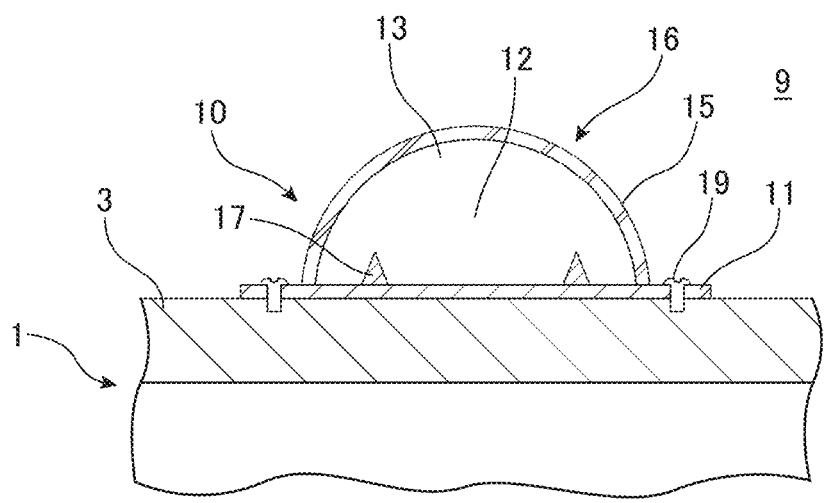
FIG. 7 is a cross-sectional view schematically depicting the configuration of the apparatus depicted in FIG. 6.

FIG. 6 schematically depicts the construction of a different example of the static eliminator 10 by way of a perspective view, and FIG. 7 schematically depicts the construction by way of a cross-sectional view. In addition to the static eliminator described above, this static eliminator 10 has discharge electrodes 17 which are installed in the first space 13 inside the sealed cover (dielectric shell) 15 and are connected to the elimination target object 1, for example, to the conductive outer surface (conductive outer structure) 3 of an aerospace device. The discharge electrodes 17 may be attached to the outer surface (surrounding structure) 3 of the aerospace device 1.

Figure 8:
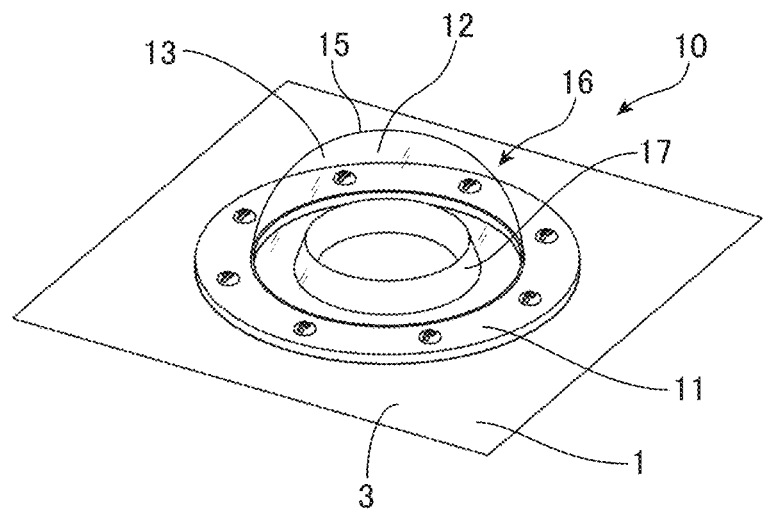
FIG. 8 is a perspective view depicting yet another example of a static eliminator.
Figure 9:
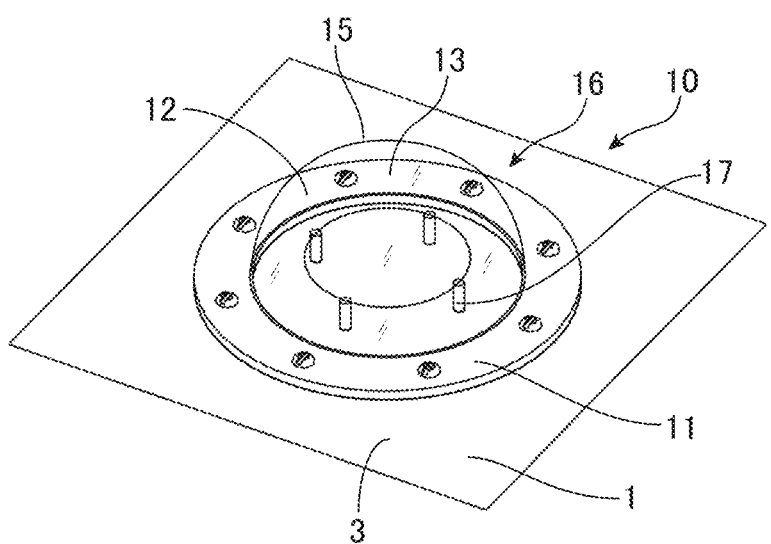
FIG. 9 is a perspective view depicting yet another example of a static eliminator.
Figure 10:
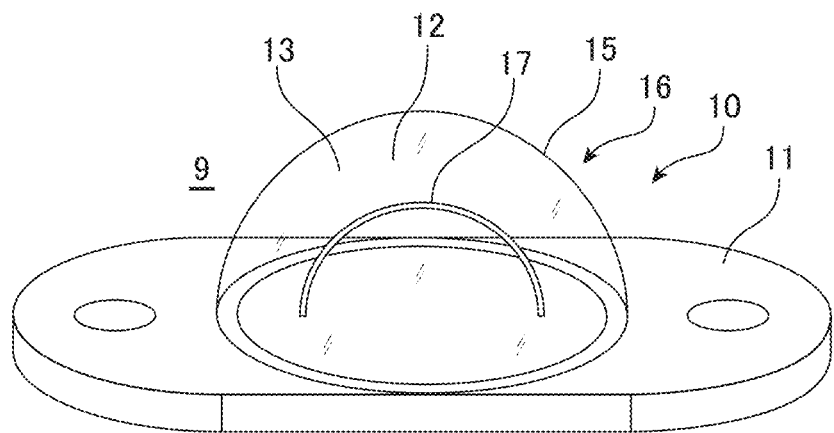
FIG. 10 is a perspective view depicting yet another example of a static eliminator.

FIGS. 8 to 10 depict example static eliminators 10 equipped with discharge electrodes 17 of different shapes. Discharge occurs according to the density of the lines of electric force. This means that with a static eliminator 10 equipped with one or more discharge electrodes 17 that protrude as depicted in FIGS. 6 and 7, an edge-shaped discharge electrode 17 as depicted in FIG. 8, or a thin wire-shaped discharge electrodes 17 as depicted in FIGS. 9 and 10, it is possible to achieve an effect of increasing the density of the electric lines of force in the first space 13 and lowering the discharge starting voltage. Accordingly, it is possible to cause or generate discharge in the first space 13 more easily, even when the potential difference (electric field) in the external space 9 is small, which makes it possible to lower the surface potential of the aerospace device 1 as much as possible.

In particular, a thin wire-shaped discharge electrode 17 formed in an upright arc shape that is erected on the substrate (first conductor) 11 as depicted in FIG. 10 is one of the examples that had the greatest effect in facilitating or generating discharge in experiments compared to other electrode shapes. In the eliminator 10, since the electric lines of force are likely to become concentrated at the electrodes 17, this lowers the discharge starting voltage as much as possible and improves the performance in eliminating static electricity. One example of the discharge electrode 17 is a tungsten wire with a diameter of around 0.01 to 0.05 mm that has been formed into a semicircular shape with a diameter of around 5 to 20 mm or around 8 to 15 mm. The glass dielectric shell 15 is a semi-ellipsoid with a major axis of around 30 to 50 mm and a minor axis of around 10 to 40 mm. The size of this embodiment of eliminator 10 including the substrate (base or first conductor) 11 has a long side of 60 to 80 mm, a short side of 25 to 55 mm, and a height of around 10 to 35 mm, and can be easily attached even to a small satellite.

The shape of the discharge electrode 17 is not limited to the shapes described above, and may be any shape that can increase the density of the electric lines of force. To make the discharge electrode 17 resistant to wear and corrosion, tungsten, which has a high melting point, may be subjected to gold plating. To efficiently emit the generated electromagnetic waves, parts of the bottom surface (first conductor) 11, aside from the discharge electrodes 17, that contact the gas 12 may be a mirrored surface. In a static eliminator 10 provided with one or more discharge electrodes 17, the discharge electrodes 17 function as the first conductor 11. For this reason, it is sufficient for the discharge electrode(s) 17 and the outer surface (outer structure) 3 of the aerospace device, which is the static elimination target object 1, to be electrically connected, and the part that forms the periphery of the first space 13 does not need to be electrically conductive. That is, the first space 13 may be formed by the dielectric shell 15 only.

Figure 11:
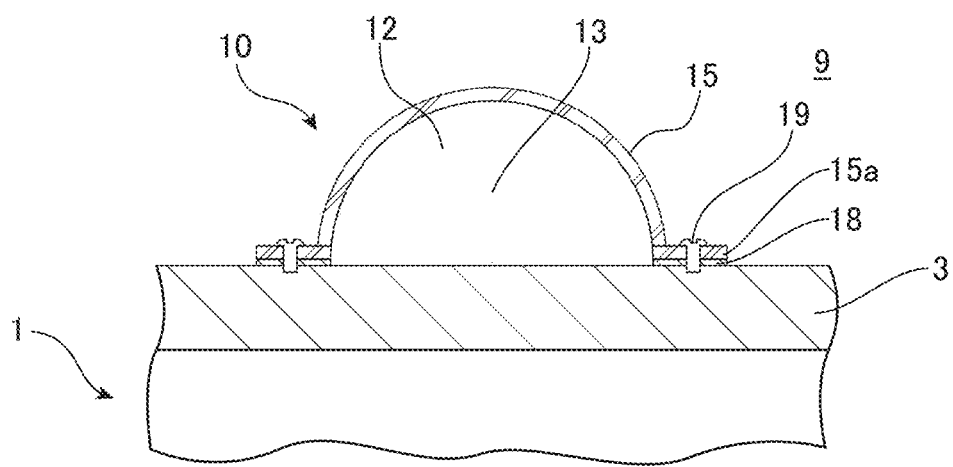
FIG. 11 is a cross-sectional view depicting yet another example of a static eliminator.

FIG. 11 depicts yet another example of the static eliminator 10. In this static eliminator 10, the first conductor 11 is constructed of a part of the static elimination target object 1, so that the static eliminator 10 is integrated with the static elimination target object 1. In more detail, in this static eliminator 10, a flange-shaped mounting portion 15a provided around the dome-shaped dielectric shell 15 is fixed to the conductive outer surface (conductive outer structure) 3 of the aerospace device that is the static elimination target object 1 using rivets 19 or the like with a ring-shaped seal 18 in between. By installing the dielectric shell 15 in an exposed state so as to protrude from the outer structure 3 without contacting other objects, a discharge region (sealed space or first space) 13 is formed so as to protrude from the outer structure 3. If the mounting portion 15a is made of metal, the mounting portion 15a may be welded to the outer structure 3 without using a ring-shaped seal. After this, the gas 12 is sealed in the first space 13 formed between the dielectric shell 15, which is the sealing cover, and the outer structure 3 by any method so as to be at a pressure where the discharge starting voltage can be minimized. As one example, a method may be used where a hole is formed in a part of the dielectric shell 15, the dielectric shell 15 is evacuated, the gas is sealed inside, and the dielectric shell 15 is then closed. As the gas 12, an inert gas, such as neon or argon, which is believed to hardly deteriorate due to electric discharge or cosmic rays, may be used to enable long-term use.

In this embodiment of static eliminator 10, the conductive surrounding surface (outer structure, outer shell or exterior) 3 of the aerospace device, which is the target object 1, contacts the gas 12 in the first space 13. It is possible to provide a static elimination target object 1, typically an aerospace device, with a dielectric shell 15 that forms, between at least a part of the surrounding structure 3 and the external space 9, the first space 13 in which the gas 12 providing or satisfying a condition of lowering the discharge starting voltage is sealed.

Unlike the static eliminators 10 depicted in FIG. 1 or the like, the static eliminator 10 depicted in FIG. 11 is integrated with the static elimination target object 1 and cannot be attached or detached. The static eliminators 10 of the type where a closed container (or sealed container) 16 is constructed by the dielectric shell 15 or by the dielectric shell 15 and the first conductor 11 can be provided as a separate body to the static elimination target object 1, can be manufactured and provided in a different manufacturing process, can be mass-produced, and can be provided at low cost. In addition, since the static eliminators 10 can be attached to and detached from the object 1, even if the static eliminators 10 become damaged by over-discharging, cosmic dust, or the like, it is easy to replace. The task of filling with the gas 12 at the manufacturing site of the aerospace device also becomes unnecessary. A ring-shaped seal 18 is no longer required, and there is no risk of gas leakage due to deterioration of the seal. Since it is not necessary to consider sealing when attaching the static eliminators 10, the connection with the outer surface of the aerospace device become simplified. As examples, it is possible to attach the static eliminators 10 by using conductive magic tape (registered trademark), conductive adhesive, or the like. If the structure of the static eliminators 10 are standardized, this makes it easier to design aerospace devices. In addition, there are several advantages, such as the ability to add static eliminator 10 to existing aerospace devices.

Figure 12:
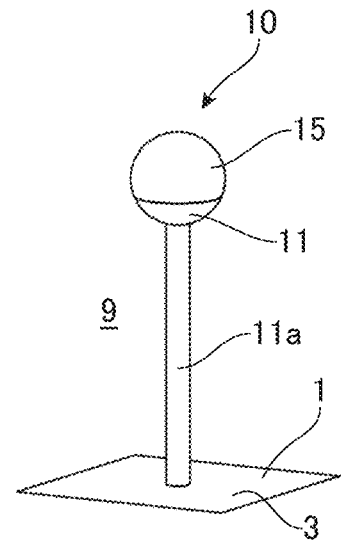
FIG. 12 is a perspective view depicting yet another example of a static eliminator.

FIG. 12 depicts yet another example of the static eliminator 10. In cases where the static elimination target object 1 is vulnerable to electromagnetic noise that accompanies electric discharge, electrically connecting the static eliminator 10 and the static elimination target object 1 with a pole 11a, a conductive wire, or the like makes it possible to install the static eliminator 10 away from the static elimination target object 1, for example, the fuselage of space equipment.

Figure 13:
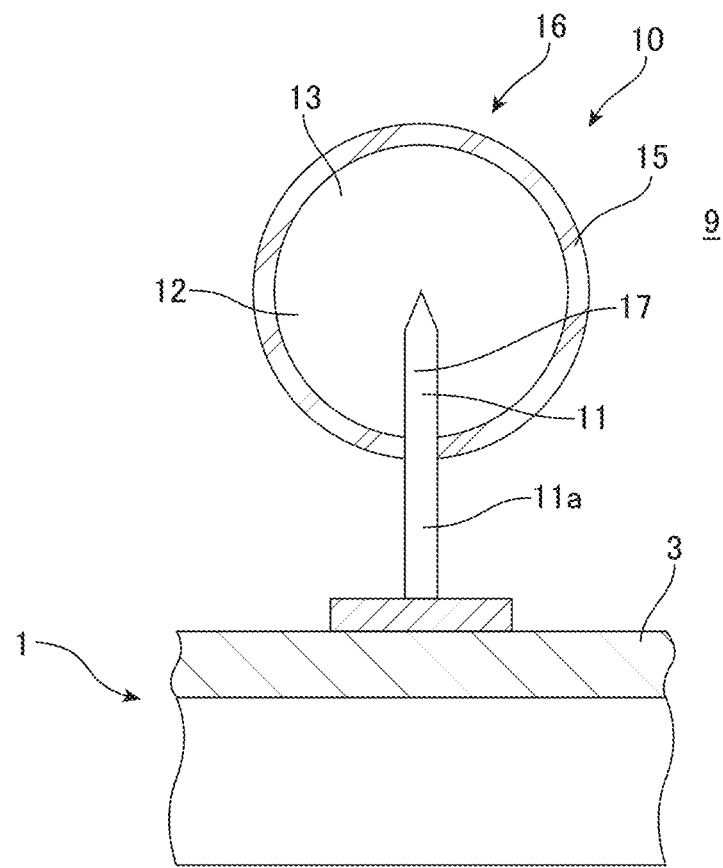
FIG. 13 is a cross-sectional view depicting yet another example of a static eliminator.

FIG. 13 depicts yet another example of the static eliminator 10. In this static eliminator 10, the first space 13 is formed around a first conductor 11 that also serves as the discharge electrode 17 by a spherical dielectric shell 15 (that is, the dielectric shell only). The discharge electrode 17 is connected to the static elimination target object 1 by a conductive support 11a, a conductive wire, or the like.

Note that although the embodiments of static eliminator 10 whose appearances are dome-shaped or spherical have been described above, it is sufficient for the static eliminator 10 to have a shape, such as an ellipsoid or an even flatter shape, that is capable of internally forming the first space 13. In particular, for use in an environment with an atmosphere, the upper surface of the apparatus 10 may be installed so as to be as flat as possible on the fuselage, which is the static elimination target object 1, so as not to affect aerodynamics. The static elimination target object 1 may be a wall body of an aerospace system, equipment, device or the like, a mounted apparatus, or the like. As the static elimination target object 1, the eliminator 10 may be installed on a structure or vehicle or the like, which is installed in a space on a satellite, such as a planet, moon, or the like where there is no or lacking atmosphere and elimination of static electricity is difficult.

As described above, the static eliminator or the static eliminator apparatus 10 described above can have a satellite or a space probe as the target object 1 for elimination of static electricity. Objects in outer space are normally incapable of reducing static electricity through self-discharge, but this becomes possible with the static eliminator 10. The static eliminator 10 functions even in the vacuum of outer space, and is capable of lowering the surface potential of an aerospace device and preventing the occurrence of failures in electrical equipment. Since the static eliminator 10 can lower the surface potential of the aerospace device, it is possible to simplify the insulation between the surface and the internal electric circuits, which contributes to reductions in weight. Since the conductive areas are spread out on the outer surface of an aerospace device, the static eliminator 10 may be installed at the respective conductive positions to lower the surface potential, which makes it possible to prevent creeping discharge at the dielectric between the conductive parts of the outer surface and prevent damage that accompanies such discharge. Since the static eliminator 10 does not depend on the polarity of the static electricity generated in the aerospace device and will cause further discharge to occur automatically according to the strength of the static electricity, no control or electric power is required. This static eliminator 10 will be effective for preventing electric discharge from occurring when aerospace devices come into contact with each other or when people or objects on the ground come into contact with an aerospace device.

The target object for the elimination of static electricity by the static eliminator 10 is not limited to an aerospace device. The static eliminator 10 is also effective for objects that move, such as automobiles, ships, and human bodies and their accessories, portable electric devices, electronic circuits, and the like since it is often difficult to ground such objects. For an electronic circuit, it is possible to eliminate a surge voltage by installing the static eliminator 10 on a circuit pattern. When a rescue operation is performed using a helicopter, a conductive rope is first placed in contact with the ground to reduce static electricity, but when the grounding is incomplete, the rescuer may receive an electric shock causing him/her to fall over or fall to the ground. The static eliminator 10 is capable of eliminating static electricity without having dangerous parts, such as protrusions and edges for self-discharge, exposed to the outside, which increases safety.

The static eliminator 10 disclosed above is an apparatus with a closed space 13 in which a gas 12 is sealed and is disposed so that the gas 12 is exposed to the surface potential of the static elimination target object 1. The structure including the first space 13 in which the gas 12 is sealed may be configured as a gas container that can be attached to and detached from the static elimination target object 1. A discharge electrode or electrodes 17 may be installed inside the closed space 13 and may be electrically connected to the conductive surface of the static elimination target object 1. By using the static eliminator 10, discharge is caused in the gas 12 inside the enclosed space by the surface potential of the static elimination target object 1, which makes it possible to eliminate static electricity from the static elimination target object by releasing energy through discharge.

Although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:
1. A static eliminator comprising:
    a first conductor that is electrically connected to at least a part of a static elimination target object; and
    a dielectric shell that is exposed to an external space and forms, between the first conductor and the dielectric shell, a first space in which a first gas providing a condition of lowering a discharge starting voltage is sealed,
    wherein the external space is outer space, or space on a planet or a satellite with lacking atmosphere, and
    the first space allows an electric discharge to occur using a surface potential derives from a static electricity accumulated in the target object and at least reduce the static electricity with ungrounding.
2. The static eliminator according to claim 1, wherein the dielectric shell is dome-shaped, spherical, ellipsoidal, or semi-ellipsoidal.
3. The static eliminator according to claim 1, wherein the dielectric shell covers at least 50% of a surface area of the first space.
4. The static eliminator according to claim 1, wherein the dielectric shell is translucent.
5. The static eliminator according to claim 1, wherein the dielectric shell is protruding into the external space and exposed in a non-contact state with other objects.
6. The static eliminator according to claim 1, wherein the first conductor covers a part of a surface of the first space.

7. The static eliminator according to claim 1,
further comprising a discharge electrode that is installed in the first space and is electrically connected to the first conductor.

8. The static eliminator according to claim 7,
wherein the discharge electrode includes a wire-shaped electrode formed in an upright arc.

9. The static eliminator according to claim 1,
wherein the first conductor is detachably attached to the static elimination target object.

10. The static eliminator according to claim 1,
wherein the first conductor is a part of the static elimination target object.

11. The static eliminator according to claim 1,
wherein the first gas includes at least one of an inert gas, a noble gas, and a mixed gas containing at least one of an inert gas and a noble gas.

12. A static elimination target object comprising the static eliminator according to claim 1.

13. An aerospace device comprising the static eliminator according to claim 1.

14. A static eliminator comprising:
a first conductor that is electrically connected to at least a part of a static elimination target object;
a dielectric shell that is exposed to an external space and forms, between the first conductor and the dielectric shell, a first space in which a first gas providing a condition of lowering a discharge starting voltage is sealed; and
a discharge electrode that is installed in the first space and is electrically connected to the first conductor for generating a single-electrode discharge,
wherein the discharge electrode allows the single-electrode discharge to occur using a surface potential derives from a static electricity accumulated in the target object and at least reduce the static electricity with ungrounding.

15. A static elimination target object comprising the static eliminator according to claim 14.

16. An aerospace device comprising the static eliminator according to claim 14.

* * * * *